United States Patent [19]

Takayama et al.

[11] Patent Number: 5,758,162
[45] Date of Patent: May 26, 1998

[54] PROGRAM TRANSLATING APPARATUS AND A PROCESSOR WHICH ACHIEVE HIGH-SPEED EXECUTION OF SUBROUTINE BRANCH INSTRUCTIONS

[75] Inventors: Shuichi Takayama, Takarazuka; Nobuo Higaki, Osaka; Nobuki Tominaga, Kyoto; Shinya Miyaji, Nara; Seiichi Urushibara, Kyoto, all of Japan

[73] Assignee: Matsushita Electric Industrial Co., LTD., Kadoma, Japan

[21] Appl. No.: 589,802

[22] Filed: Jan. 22, 1996

[30] Foreign Application Priority Data

May 10, 1995 [JP] Japan .................................... 7-111701

[51] Int. Cl.$^6$ .................................................... G06F 9/45
[52] U.S. Cl. ...................................... 395/705; 395/580
[58] Field of Search .................................. 395/705, 580, 395/581

[56] References Cited

U.S. PATENT DOCUMENTS

| | | | |
|---|---|---|---|
| 5,274,820 | 12/1993 | Gillet ......................................... | 395/705 |
| 5,321,823 | 6/1994 | Grundmann et al. ..................... | 395/565 |
| 5,375,242 | 12/1994 | Kumar et al. ............................. | 395/707 |
| 5,488,730 | 1/1996 | Brown et al. ............................. | 395/800.41 |

OTHER PUBLICATIONS

Srivastava et al.; "Prophetic Branches: A Branch Architecture for Code Compaction and Efficient Execution"; Microarchitecture, 1993 International Symposium; pp. 94–99, 1993.

"A Survey of Branch Techniques in Pipelined Processors", by A.M. Gonzales, 8205 Microprocessing and Microprogramming 36(1993) Oct., No. 5.

"Inside Intel's i960CA Superscalar Processor", by S. McGeady, 2407 Microprocessoers and Microsystems, 14 (1990) Jul./Aug., No. 6

*Primary Examiner*—William M. Treat
*Assistant Examiner*—Kenneth R. Coulter
*Attorney, Agent, or Firm*—Price, Gess & Ubell

[57] ABSTRACT

A program translating apparatus is composed of a translation unit 103 and a link unit 108. The translation unit 103 includes a determination unit 105 which detects the stack size to be needed for each subroutine included in a source program to be translated into a machine instruction sequence and the name of a register to be retrieved in the process of each subroutine. The determination unit 105 then stores the stack size and the name detected into a file together with the machine instruction sequence. The link unit 108 includes the following units: A branch instruction detection unit 109 detects a branch instruction from the machine instruction sequence when machine instruction sequences stored in different files are linked each other. A file detection unit 110 and an acquisition unit 111 retrieve the stack size and the register name from the file which has the branch target subroutine. A subroutine call instruction generation unit 112 replaces the branch instruction with an instruction which consequently executes a branch operation, a stack reservation, and register retrieval.

6 Claims, 11 Drawing Sheets

FIG. 6

⟨ input file 101 ⟩

⟨ input file 102 ⟩

```
g(int p1, int p2)
{
        int a, b;

⟨ output file 106 ⟩

```
_f      .STACKSIZE 8    ⎫
        .REGLIST        ⎬ 41
        add   #-8,sp    ⎫
        mov   1,(sp+4)  ⎪
        mov   2, (sp)   ⎬ 42
        jsr   _g        ⎪
        add   #8,sp     ⎪
        rts             ⎭
```

FIG. 9

⟨output file 107⟩

```
_g      .STACKSIZE 16       ⎫
        .REGLIST r1,r2      ⎬ 51
        mov   r1,(sp-4)     ⎫
        mov   r2,(sp-8)     ⎪
        add   #-16,sp       ⎪
                            ⎪
        mov   (sp+24), r1   ⎪
        mov   (sp+20), r2   ⎪
        add   r1,r2         ⎬ 52
        mov   r2,(sp+4)     ⎪
        mov   (sp+24), r1   ⎪
        mov   (sp+20), r2   ⎪
        sub   r2,r1         ⎪
        mov   r1,(sp)       ⎪
                            ⎪
        add   #16,sp        ⎪
        mov   (sp-8),r2     ⎪
        mov   (sp-4),r1     ⎪
        rts                 ⎭
```

FIG.10

⟨execution file 113⟩

```
_f
        add   #-8, sp
        mov   2, (sp)
        mov   1, (sp+4)
        call  _g, #16, r1, r2
        add   #8, sp
        rts _g      mov   (sp+24), r1
        mov   (sp+20), r2
        add   r1, r2
        mov   r2, (sp+4)
        mov   (sp+24), r1
        mov   (sp+20), r2
        sub   r2, r1
        mov   r1, (sp)

add   #16, sp
        mov   (sp-8), r2
        mov   (sp-4), r1
        rts
```

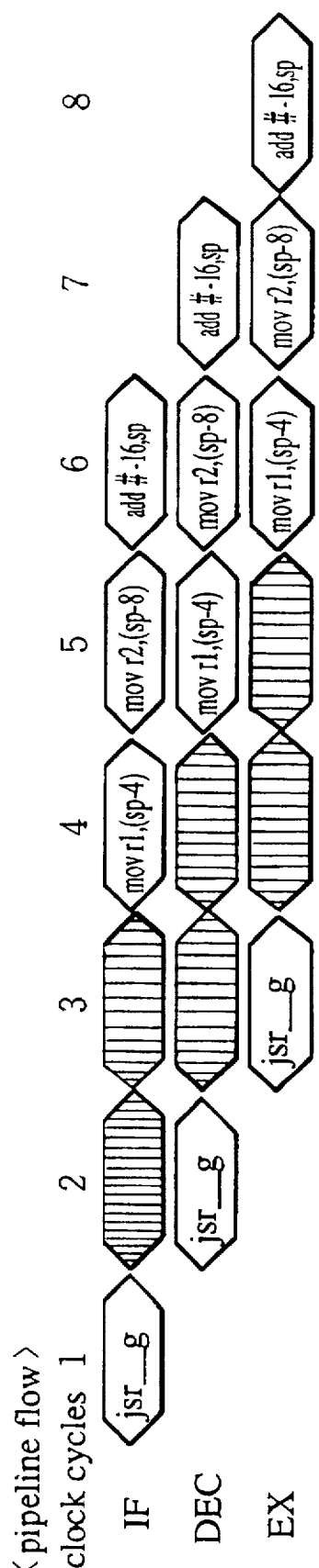

FIG. 13A

⟨instructions⟩ code    call __g,#16,r1,r2
        :
        __g

FIG. 13B

⟨pipeline flow⟩
clock cycles  1      2              3              4              5              6

IF    jsr __g   mov r1,(sp-4)  mov r2,(sp-8)  add #-16,sp
DEC             jsr __g        mov r1,(sp-4)  mov r2,(sp-8)  add #-16,sp
EX                             jsr __g        mov r1,(sp-4)  mov r2,(sp-8)  add #-16,sp

PROGRAM TRANSLATING APPARATUS AND A PROCESSOR WHICH ACHIEVE HIGH-SPEED EXECUTION OF SUBROUTINE BRANCH INSTRUCTIONS

BACKGROUND OF THE INVENTION (1) Field of the Invention

The present invention is related to a program translating apparatus which translates source programs into machine instruction sequences and links the machine instruction sequences each other, and to a processor which executes the machine instruction sequences which have been produced by the program translating apparatus. The present invention is particularly related to a program translating apparatus and a processor which are free from pipeline stalls during the execution of a branch instruction which causes a branch to a subroutine.

(2) Description of the Related Art

A pipeline processing is one of the fundamental techniques for speeding up the process of CPU, which is hereinafter referred to as a processor.

In the pipeline processing, the process of one instruction is divided into a plurality of stages, and all the stages are executed at the same time to speed up the process.

However, the execution of a branch instruction is accompanied by a pipeline stall, which makes the performance of the pipeline processing fail to reach the theoretical level. This phenomenon is referred to as a branch hazard.

FIG. 1 shows an instruction sequence which involves the branch hazard.

FIG. 2 shows the pipeline flow of the instruction sequence in clock cycles 1 through 6. The pipeline is composed of three stages: instruction fetch (hereinafter IF), instruction decode (hereinafter DEC), and instruction execution and effective address generation (hereinafter EX).

It is assumed that an instruction 1 is a branch instruction which causes a branch to a subroutine which starts at address A. The instruction 1 is fetched at IF stage in clock cycle 1, and executed at EX stage in clock cycle 3. Consequently, an instruction A on address A is fetched in clock cycle 4, and executed in clock cycle 6. The execution of the instruction A is delayed three clock cycles after the execution of the instruction 1 because instructions 2 and 3 are already in the pipeline and must be nullified. The presence of pipeline stalls is indicated in gray in FIG. 2.

A method of solving such a branch hazard is known as a delayed branch method, which is referred to in David A. Patterson and John L. Hennesy, "Computer Architecture: A Quantitative Approach", Morgan Kaufmann Publishers, 1990, p265–p270.

In the delayed branch method, a compiler schedules instructions in the manner that a branch target instruction is placed beforehand in a location (branch-delay slot) which immediately follows the branch instruction.

FIG. 3 shows an instruction sequence where branch target instructions A and B are placed on branch-delay slots, namely addresses 2 and 3, respectively.

FIG. 4 shows the pipeline flow of the instruction sequence shown in FIG. 3. As is apparent from the pipeline flow, the delayed branch method causes no pipeline stall because useless instructions are not fetched. Consequently, there is no issue of the branch hazard.

However, the delayed branch method still has a drawback that a branch target instruction cannot not always be moved to a branch-delay slot, and as a result, a branch hazard is not always solved.

To be more specific, the subroutine which starts at address A in FIG. 1 may not be recognized by the compiler. Generally, a compiler compiles a file of programs as a unit. If a program which includes the instruction 1 and a subroutine which includes the instructions A and B are stored in different files, and if only the file with the program is given, the compiler cannot place the instructions A and B in branch-delay slots. Consequently, in the case where a branch is taken to an instruction that is stored in another file, the branch hazard is still unavoidable.

In order to solve such a problem, a program may be generated not to cause a branch to a subroutine in another file, or all related subroutines may be stored in the same file by checking the branch points of a program in advance.

However, in either case, it must always be considered to arrange branch target subroutines when a program is generated, which deteriorates the operation efficiency of designing and developing programs. Moreover, the size of files must be increased, so that a large amount of time is required for program translation.

SUMMARY OF THE INVENTION

In view of these problems, the object of the present invention is to provide a program translating apparatus which generates an object program which can call a subroutine without causing a pipeline stall even if an instruction to call a subroutine and the subroutine to be called are stored in different files, and further to provide a processor which executes the object program.

The object is achieved by the program translating apparatus and the processor which operate as follows.

When a source program is translated into a machine instruction sequence, the stack size necessary for the process of each subroutine included in the source program is detected and stored in a file together with the machine instruction sequence of the corresponding subroutine.

Then, when the machine instruction sequences in different files are linked, a branch instruction which causes a branch to a subroutine is detected from the machine instruction sequences, a stack size required for the process of the branch target subroutine is read from the file where the branch target subroutine is stored, and the branch instruction is replaced by an instruction which consecutively performs a branch operation which causes a branch to the branch target subroutine and a stack reserve operation which reserves a stack for the stack size.

The processor which executes such an object program does not fetch an instruction which reserves a stack after a branch has been caused to a subroutine. Instead, the processor performs the same operations as consecutively fetching an instruction which causes a branch to a subroutine and another instruction which reserves a stack.

The object is also achieved by the program translating apparatus and the processor which operate as follows.

When a source program is translated into a machine instruction sequence, the name of a register to be saved in the process of each subroutine included in the source program is detected and stored in a file together with the machine instruction sequence of the corresponding subroutine.

Then, when the machine instruction sequences in different files are linked, a branch instruction which causes a branch to a subroutine is detected from the machine instruction sequences, the name of the register to be saved is read from the file where the branch target subroutine is stored, and the branch instruction is replaced by an instruction which consecutively performs a branch operation which causes a branch to the branch target subroutine and a register save operation which saves the contents of the register.

The processor which executes such an object program does not fetch an instruction which reserves the contents of the register after a branch has been caused to a subroutine. Instead, the processor performs the same operations as sequentially fetching an instruction which causes a branch to a subroutine and another instruction, which saves the contents of the register.

The object is also achieved by the program translating apparatus and the processor which operate as follows.

When a source program is translated into a machine instruction sequence, the stack size necessary for the process of each subroutine and the name of a register to be saved in the process of each subroutine included in the source program are detected and stored in a file together with the machine instruction sequence of the corresponding subroutine.

Then, when the machine instruction sequences in different files are linked, a branch instruction which causes a branch to a subroutine is detected from the machine instruction sequences, the stack size and the name of the register are read from the file where the branch target subroutine is stored, and the branch instruction is replaced by an instruction which consecutively performs a branch operation which causes a branch to the branch target subroutine, and a stack reserve operation which reserves a stack for the stack size, and a register save operation which saves the contents of the register.

The processor which executes such an object program does not fetch an instruction which reserves a stack for the stack size and an instruction which saves the contents of the register after a branch has been caused to a subroutine. Instead, the processor performs the same operations as sequentially fetching an instruction which causes a branch to a subroutine, an instruction which reserves the stack, and an instruction, which saves the contents of the register.

As explained hereinbefore, the program translating apparatus and the processor of the present invention have achieved high-speed branch operations free from a pipeline stall even if an instruction to call a subroutine and the subroutine to be called are stored in different files.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 6 shows the source list of main program f( ) stored in the input file 101.

FIG. 7 shows the source list of subroutine g( ) stored in the input file 102.

FIG. 8 shows a list of machine instructions included in the main program f( ) which is stored in the output file 106.

FIG. 9 shows a list of machine instructions included in the subroutine g( ) which is stored in the output file 107.

FIG. 10 shows a list of object programs stored in the execution file 113.

FIG. 12A shows an instruction sequence which includes a ordinary branch instruction: jsr, and FIG. 12B shows a pipeline flow of the execution of the instruction sequence.

FIG. 13A shows an instruction sequence which includes the subroutine call instruction:call, and FIG. 13B shows a pipeline flow of the execution of the instruction sequence.

DESCRIPTION OF THE PREFERRED EMBODIMENTS

<Embodiment 1>
(the construction of the program translating apparatus)

Figure 1:
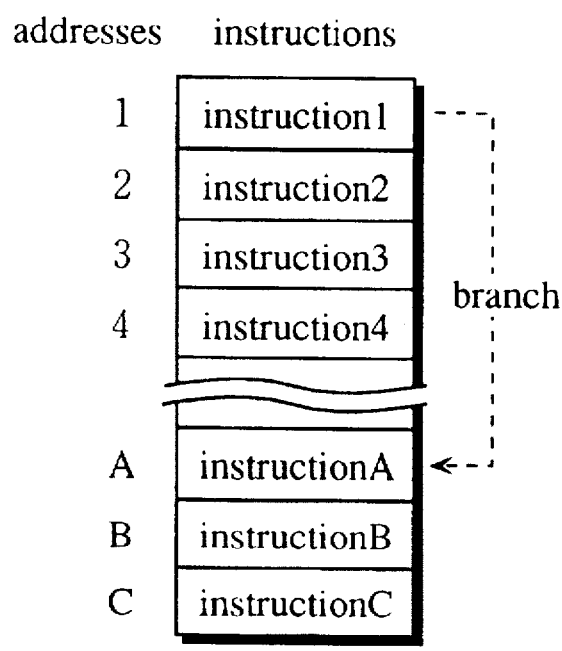
FIG. 1 shows an instruction sequence which causes a branch hazard.
Figure 2:
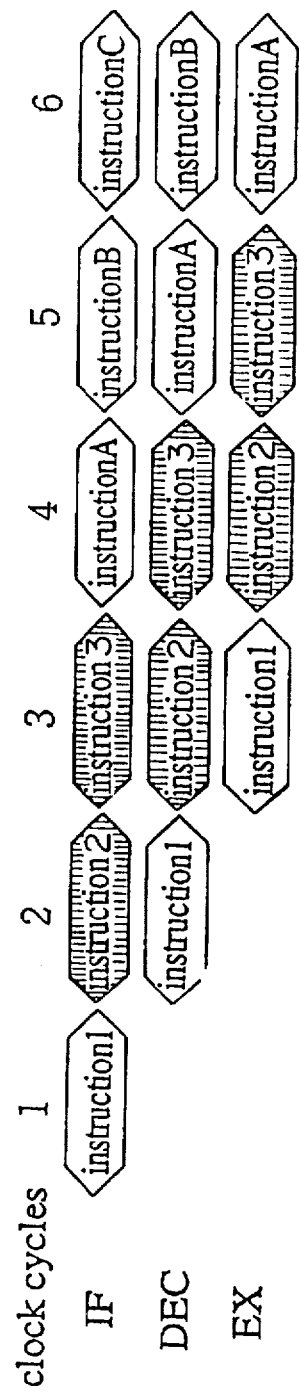
FIG. 2 shows the pipeline flow of the instruction sequence shown in FIG. 1 when it is executed by the conventional processor.
Figure 3:
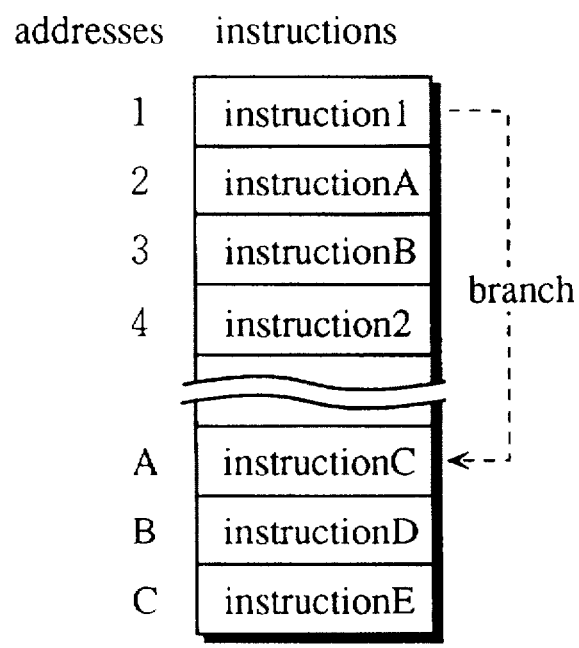
FIG. 3 shows the instruction sequence shown in FIG. 1 in the case where branch target instructions are placed on branch-delay slots.
Figure 4:
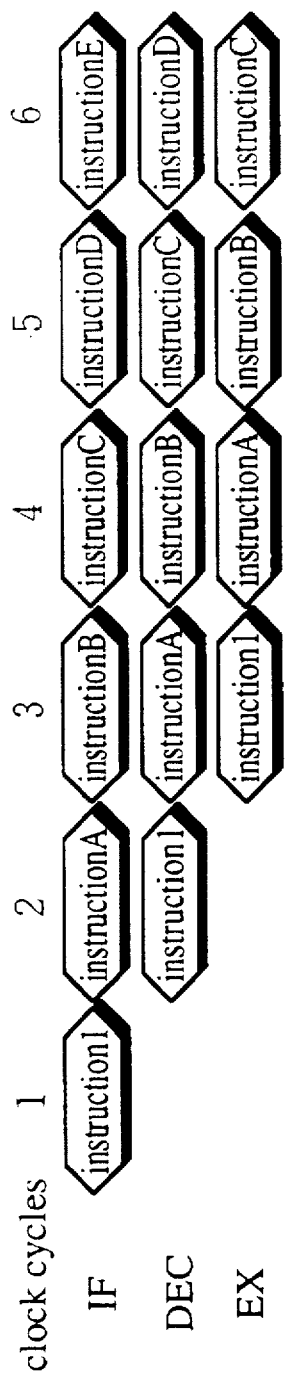
FIG. 4 shows the pipeline flow of the instruction sequence shown in FIG. 3 when it is executed by the conventional processor.
Figure 5:
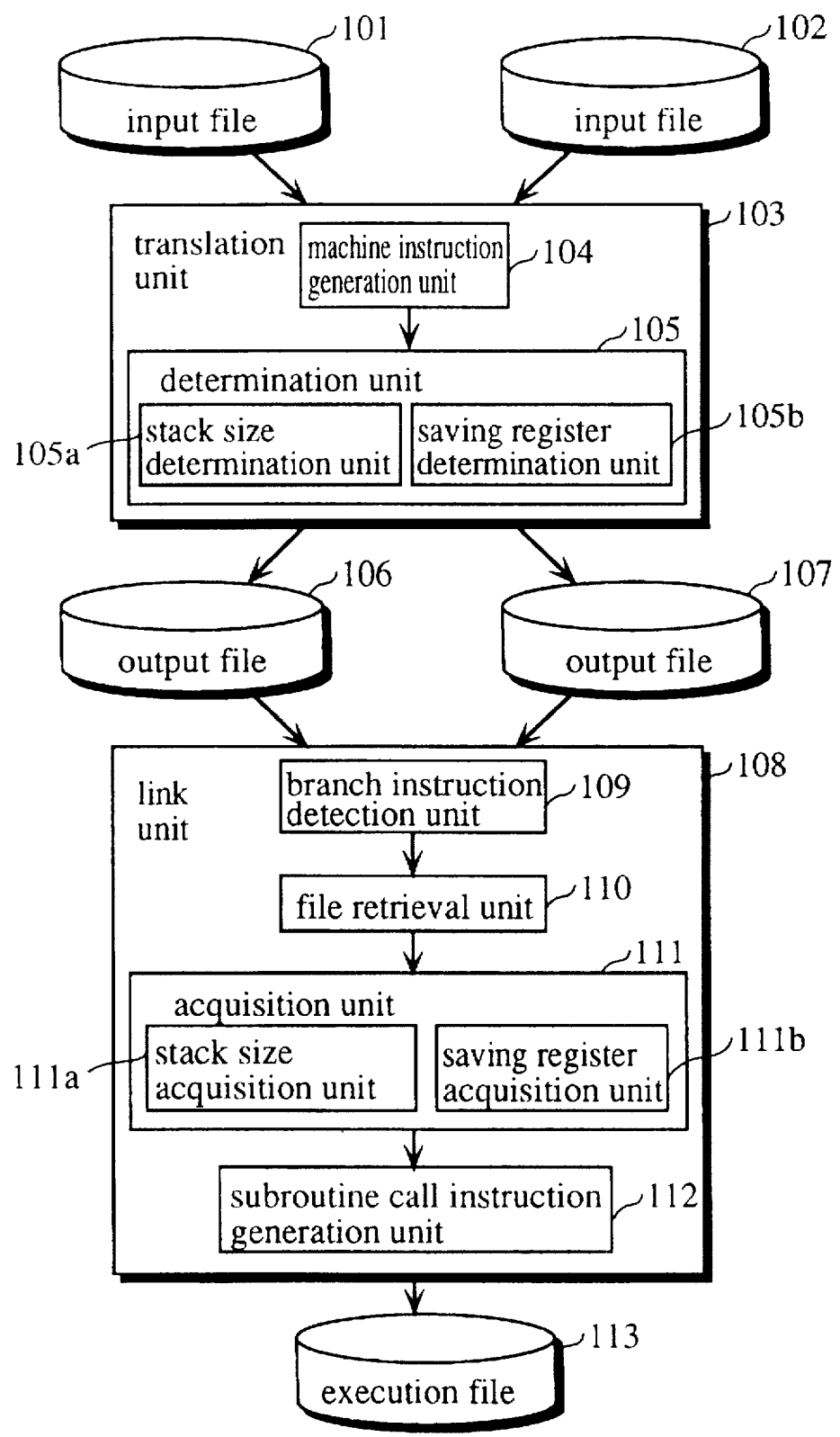
FIG. 5 shows the block diagram of the program translating apparatus of the present embodiment.

FIG. 5 shows the block diagram of the program translating apparatus of the present embodiment. FIG. 5 includes input files 101 and 102, and output files 106 and 107 to be processed, and an execution file 113 to be produced.

The program translating apparatus is mainly composed of a translation unit 103 and a link unit 108.

The translation unit 103 mainly translates source programs which are written in a high-level language into machine instruction sequences. The translation unit 103 receives and processes the input files 101 and 102 where source programs are stored, and outputs the output files 106 and 107 where machine instruction sequences are stored.

The translation unit translates a file as a unit. For example, if the translation unit 103 receives the input file 101 only, it automatically determines the name for the input file 101, and outputs the output file 106.

The translation unit 103 is composed of a machine instruction generation unit 104 and a determination unit 105.

The machine instruction generation unit 104 translates a given source program into a machine instruction sequence through some analyses such as a semantic analysis.

The determination unit 105 is composed of a stack size determination unit 105a and a saving register determination unit 105b.

The stack size determination unit 105a calculates a stack size to accommodate the process of each subroutine of a given source program, generates a pseudo-instruction which indicates the stack size calculated, and places the pseudo-instruction at the top of the machine instruction sequence of the subroutine. The stack size refers to the size of an operation area to be used for the process of a subroutine, and the pseudo-instruction is used to carry information on the stack size calculated to the link unit 108.

The saving register determination unit 105b detects a register to be saved prior to the process of each subroutine, generates a pseudo-instruction which indicates the register detected, and places the pseudo-instruction at the top of the machine instruction sequence of the subroutine. The register to be saved has a value which is supposed to be broken in the process of the subroutine. The pseudo-instruction is used to carry information on the register to be saved to the link unit 108.

The link unit 108 generates an object program by mainly linking machine instruction sequences, which the processor of the present invention can execute. At the same time, the link unit 108 processes the pseudo-instructions which have been generated by the translation unit 103. Since the linking operation is the same as an ordinary linking operation, the unit in charge of the operation is not shown.

The link unit 108 receives and processes the output files 106 and 107, and in turn outputs the execution file 113.

The link unit 108 is composed of a branch instruction detection unit 109, a file retrieval unit 110, an acquisition unit 111, and a subroutine call generation unit 112. The acquisition unit 111 is composed of a stack size acquisition unit 111a and a saving register acquisition unit 111b.

The branch instruction detection unit 109 detects a branch instruction from an output file received, and inform the file retrieval unit 110 of the branch instruction detected. In this case, the branch instruction refers to an instruction which causes a branch to a subroutine.

The file retrieval unit 110 identifies the name of the file where a branch target subroutine designated by the branch instruction is stored, and informs the stack size acquisition unit 111a and the saving register acquisition unit 111b of the file label identified, together with the name of the branch target subroutine.

The stack size acquisition unit 111a interprets the pseudo-instruction which is placed at the top of the branch target subroutine in the file which has been informed by the file retrieval unit 110. The stack size acquisition unit 111a then informs the subroutine call instruction generation unit 112 of the stack size which is necessary for the process of the subroutine.

The saving register acquisition unit 111b interprets the pseudo-instruction in the same manner, and informs the subroutine call instruction generation unit 112 of the register to be saved.

The subroutine call instruction generation unit 112 generates a special subroutine call instruction, based on the stack size and the register informed by the acquisition unit 111. The special subroutine call instruction is a machine instruction which makes the processor perform in sequence three operations: a branching operation, a stack reserving operation, and a register saving operation, without causing a pipeline stall.

The link unit 108 replaces a branch instruction which causes a branch to the subroutine with the special subroutine call instruction which has been generated by the subroutine call instruction generation unit 112. The link unit 108 then generates an object program from which machine instructions for stack reservation and register saving are deleted, and outputs the object program as the execution file 113.

The process of the link unit 108 is done for every branch instruction which has been detected by the branch instruction detection unit 109.

(the operation of the program translating apparatus)

The operation of the program translating apparatus of the present invention will be explained as follows, with a specific program.

As shown in FIG. 6, the input file 101 presently stores the main program f( ) which calls a subroutine g( ) with two arguments.

As shown in FIG. 7, the input file 102 presently stores a subroutine g( ), which calculates the sum and the difference between the two arguments.

When the translation unit 103 has received the input file 101, it translates the main program f( ) into a machine instruction sequence, determines the stack size to be required by the main program f( ) and the register to be saved, and generates and outputs the output file 106 shown in FIG. 8.

In the same manner, when the translation unit 103 has received the input file 102 shown in FIG. 7, it translates the subroutine g( ) into a machine instruction sequence, determines the stack size to be required by the subroutine g( ) and the register to be saved, and generates and outputs the output file 107 shown in FIG. 9.

The meaning of each of the machine instructions in the output files 106 and 107 is as follows.

_f indicates the label of the function.

.STACKSIZE s indicates that the stack size to be required for the process of the function is s-byte long.

.REGLIST r1, r2 indicates that registers to be saved prior to the process of the function are r1 and r2.

sp indicates a stack pointer.

xxxx indicates that the immediate value is xxxx.

(sp+xxx) indicates data whose address is sp+xxxx in the memory.

add src, dst indicates that a value of dst+src is moved to dst.

sub src, dst indicates that a value of dst—src is moved to dst.

mov src, dst indicates that src is moved to dst.

jsr label indicates that 4 is subtracted from sp, the address of the next instruction is moved to (sp), and the instructions in label are executed.

rts indicates that the instructions indicated by (sp) are executed and 4 is added to sp.

In FIG. 8, the instructions indicated as 41 and 42 have been generated by the determination unit 105 and the machine instruction generation unit 104, respectively.

The stack size determination unit 105a determines that the main program f( ) needs the stack size of 8 bytes, and generates the pseudo-instruction: .STACKSIZE 8. This is because the main program f( ) which calls the subroutine g( ) after having stored the two arguments 1 and 2 on stacks needs a 4-byte stack to store each argument.

The saving register determination unit 105b generates only the pseudo-instruction: .REGLIST because there is no register to be saved prior to the process of the main program f( ).

In FIG. 9, the instructions indicated as 51 and 52 have been generated by the determination unit 105 and the machine instruction generation unit 104, respectively.

The stack size determination unit 105a determines that the subroutine g( ) needs the stack size of 16 bytes, and generates the pseudo-instruction: .STACKSIZE 16. This is because the process of the subroutine g( ) requires 16-byte stack as an area to save the values of two registers and to store two calculation results: a and b.

The saving register determination unit 105b determines that the registers r1 and r2 should be saved prior to the process of the subroutine g( ), and generates the pseudo-instruction .REGLIST r1, r2.

When the link unit 108 has received the output files 106 and 107 which have been generated by the translation unit 103, the branch instruction detection unit 109 detects a branch instruction from these output files.

The branch instruction: jsr _g is detected from the output file 106 shown in FIG. 8 by the branch instruction detection unit 109, and the detection is reported to the file retrieval unit 110.

The file retrieval unit 110 retrieves the output files 106 and 107, and knows that the branch target subroutine _g is defined in the output file 107. Then, the file retrieval unit 110 reports it to the stack size acquisition unit 111a and the saving register acquisition unit 111b.

The stack size acquisition unit 111a and the saving register acquisition unit 111b acquire information on the stack size to be required (16 bytes) and the registers to be saved (r1 and r2) from the pseudo-instruction which is placed at the top (51) of the subroutine _g, and reports the information to the subroutine call instruction generation unit 112.

Based on the information, the subroutine call instruction generation unit 112 generates a subroutine call instruction: call _g, #16, r1, r2. The subroutine call instruction: call label, 1sz, rn, rm is a single machine instruction which causes the registers rn and rm to be saved to (sp-4) and (sp-8) in the clock cycles with a branch hazard, and also causes sp to be reduced by 1sz, after 4 is subtracted from sp, the address of the next instruction is moved to (sp), and the instructions in _label are executed.

In other words, the execution of the subroutine call instruction: call _g, #16, r1, r2 is equivalent to the execution of the following instruction sequence without causing a branch hazard.

jsr _g
    mov r1, (sp-4)
    mov r2, (sp-8)
    add #—16, sp

The link unit 108 replaces the branch instruction: jsr _g, which is stored in the output file 106 with the subroutine call instruction: call _g, #16, r1, r2, and generates an object program which does not include the instruction: mov r1, (sp-4), mov r2, (sp-8) for register saving, and the instruction: add #—16, sp for stack reservation, and outputs the object program as the execution file 113.

FIG. 10 shows a list of the instructions stored in the execution file 113. The subroutine call instruction: call _g, #16, r1, r2 is used to call the subroutine _g from the main program _f, and the instructions for register saving and stack reservation are deleted from the top of the subroutine _g.

As explained hereinbefore, in the program translating apparatus of the present invention, when a source program is translated into a machine instruction sequence, the translation unit 103 adds the information on a necessary stack size and a register to be saved as a pseudo-instruction to the top of the machine instruction sequence of each subroutine.

Then, when machine instruction sequences are linked each other, the link unit 108 replaces a branch instruction which causes a branch to a subroutine in another file with a single subroutine call instruction which performs a branch-to-subroutine operation, a register saving operation, and a stack reserving operation sequentially without causing a branch stall, by referring to the pseudo-instruction placed at the top of each subroutine. Consequently, the processor of the present invention which executes the programs which have been generated by the link unit 108 can perform a branch operation at a high speed without causing the branch hazard, even if a branch is caused to a subroutine defined in a different file.

<Embodiment 2>
(the construction of the processor)

Figure 11:
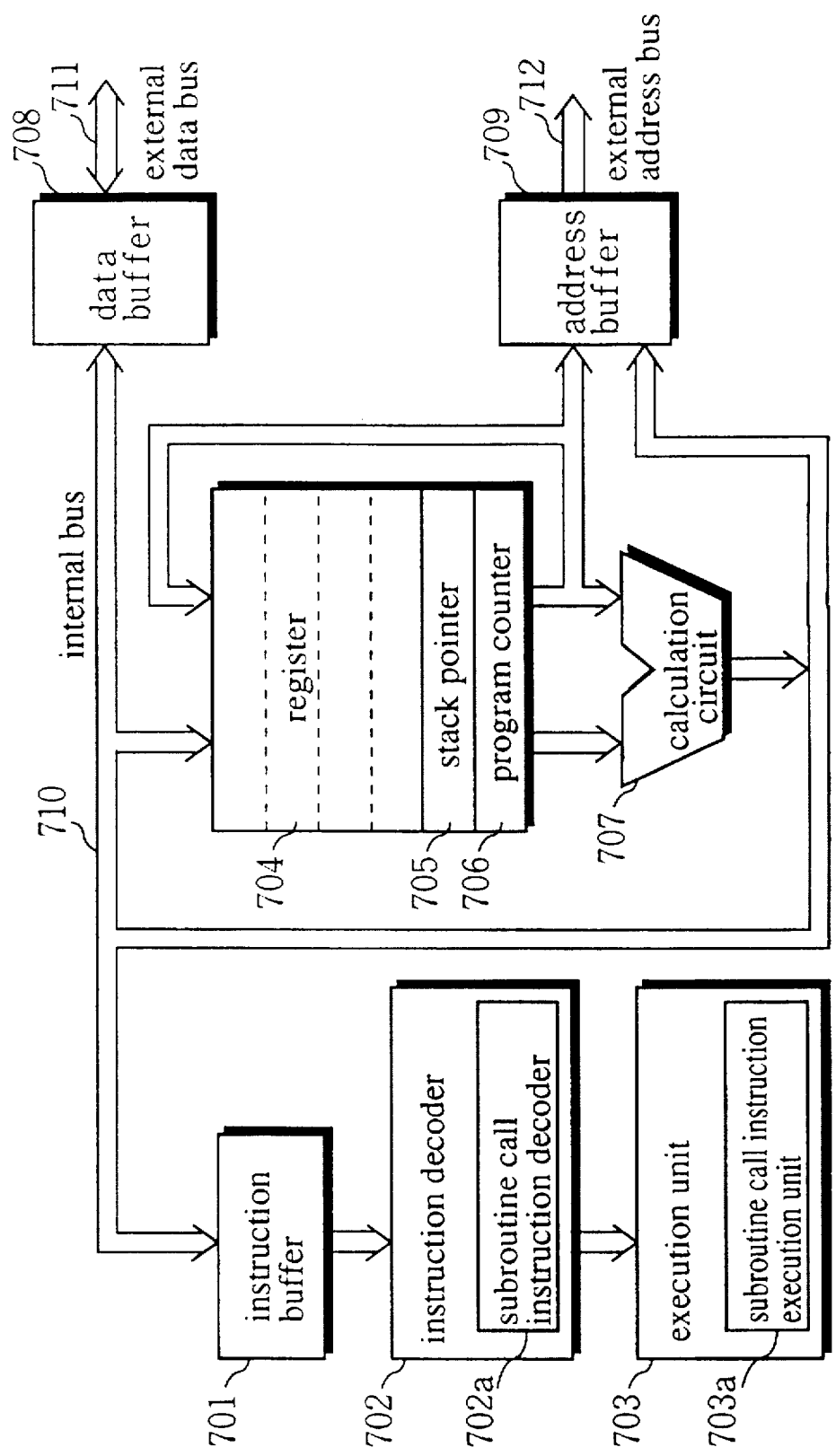
FIG. 11 shows a block diagram of the construction of the processor of the present invention.

FIG. 11 is a block diagram which shows the construction of the processor of the present invention.

The processor is composed of an instruction buffer 701, an instruction decoder 702, an execution unit 703, a register 704, a stack pointer 705, a program counter 706, a calculation circuit 707, a data buffer 708, an address buffer 709, and the internal bus 710.

The data buffer 708 and the address buffer 709 carry data between the internal bus 710 and an external data bus 711, and between the internal bus 710 and an external address bus 712, respectively.

The register 704 temporarily stores data for calculations and addresses of an unillustrated main memory.

The stack pointer 705 stores addresses which indicate stack areas provided in the main memory.

The program counter 706 stores the address of an instruction to be next fetched from the main memory.

The calculation circuit 707 performs a logical operation with two different data received.

The instruction buffer 701 fetches instructions and stores them on a first-in, first-out basis.

The instruction decoder 702 receives instructions from the instruction buffer 701, decodes them one by one, and reports the decoding results to the execution unit 703. The instruction decoder 702 has functions of decoding all the predetermined instructions and of sending information unique to each of the predetermined instructions to the execution unit 703; however, the subroutine call instruction decoder 702a represents a function of decoding subroutine call instructions.

The execution unit 703 controls each of the units 701–709 by using an unillustrated internal control signal, based on the information received from the instruction decoder 702, and inputs or outputs an unillustrated external signal.

Among the functions of the execution unit 703, the subroutine call instruction execution unit 703a represents a function of executing subroutine call instructions.

The instruction buffer 701, the instruction decoder 702, and the execution unit 703 work as IF stage, DEC stage, and EX stage, respectively, thereby composing a pipeline.
(the operation of the processor)

The following is the operation of the processor of the present invention to execute an ordinary branch instruction: jsr. FIG. 12A shows an instruction sequence which includes a ordinary branch instruction: jsr, and FIG. 12B shows a pipeline flow of the execution of the instruction sequence.

The branch instruction:jsr _g is fetched by the instruction buffer 701 in clock cycle 1, decoded by the instruction decoder 702 in clock cycle 2, and executed by the execution unit 703 in clock cycle 3.

In clock cycle 3, the execution unit 703 updates the value of the program counter 706 to the branch target address _g. Consequently, the instruction:mov r1, (sp-4) on the address _g is moved to the instruction buffer 701 in clock cycle 4.

In order to execute the next instruction:mov r1, (sp-4), which follows the instruction:jsr _g, the execution unit 703 neglects to execute the instructions accompanied by the branch hazard which appear in gray in FIG. 12B. Consequently, the execution unit 703 executes the instruction:mov r1, (sp-4) two clock cycle after the execution of the instruction:jsr _g.

The operation of the present invention explained so far is not different from that of the conventional processor.

The following is an explanation of the operation to execute the subroutine call instruction: call, by the processor of the present invention. FIG. 13A shows an instruction sequence which includes the subroutine call instruction:call, and FIG. 13B shows a pipeline flow of the execution of the instruction sequence.

When the subroutine call instruction: call _g, #16, r1, r2, which is a single instruction, is decoded by the subroutine call instruction decoder 702a, and executed by the subroutine call execution unit 703a, the processor performs operations which are equal to the consecutive execution of the following four instructions.

That is, jsr _g is executed first, and then mov r1, (sp-4)

mov r2, (sp-8)

add #—16, sp are executed in the clock cycles accompanied by the branch hazard.

Thus, the pipeline flow shown in FIG. 13B is equivalent to the execution of the subroutine call instruction: call _g, #16, r1, r2 by the execution unit 703.

The branch instruction:jsr _g is fetched by the instruction buffer 701 in clock cycle 1, decoded by the instruction decoder 702 in clock cycle 2, and executed by the execution unit 703 in clock cycle 3.

The execution unit 703, which has executed the branch instruction: jsr _g in clock cycle 3 executes the instruction: mov r1, (sp-4) in clock cycle 4.

The pipeline flow shown in FIG. 13B shows no hazard although the same instructions as shown in FIG. 12B are processed there.

This indicates that when the processor of the present invention executes the subroutine call instruction:call _g, #16, r1, r2, the branch hazard is successfully solved, and furthermore, the time to execute the subroutine call instruction is shorter by 2 clock cycles than the time to execute an ordinary branch instruction.

The program translating apparatus and the processor of the present invention explained hereinbefore include the following cases 1)–6).

1) Although the subroutine call instruction generation unit 112 generates a single machine instruction: call _g, #16, r1, r2 in the first embodiment, more than one machine instruction may be generated. For example, the following four machine instructions may be generated:

call _g mov r1, (sp-4)

mov r2, (sp-8)

add #—16, sp

That is, the subroutine call instruction: call _g makes the processor branch to the subroutine _g and execute the three instructions consecutively without causing the branch hazard.

2) The subroutine call instruction to be generated in the first embodiment is a branch instruction which involves two operations: a stack reservation and register save. However, a branch instruction which involves either operation may be generated. For example, when a branch is taken to a subroutine which does not need register save, a branch instruction which involves only stack reservation such as call _g, #16 may be generated.

3) The machine instruction generation unit 104 may be replaced by a normal compiler which compiles a program into a rearrangeable object program, and the linking function of the link unit 108 may be replaced by a general link device which generates an object program by linking the object program. These replacements realize a C-language compiler which corresponds to the program translating apparatus of the first embodiment.

4) Subroutine call instructions are generated exclusively by the link unit 108 in the first embodiment; however, the translation unit 103 in addition to the link unit 108 may be provided with the units 109–112. This construction allows the translation unit 103 to generate a subroutine call instruction that calls a subroutine stored in the same file.

5) The subroutine call execution unit 703a executes the single subroutine call instruction: call _g, #16, r1, r1 by dividing it into four consecutive instructions in the second embodiment. This is, needless to say, realized by unillustrated microprogram and wired logic.

6) The second embodiment shows the avoidance of a pipeline stall for 2 clock cycles to be caused by the branch instruction: jsr; however, other pipeline stalls can be avoided as well.

For example, even if a pipeline stall for three cycles is caused in the pipeline flow shown in FIG. 12 due to too large access time of the ROM where a subroutine _g is stored, it is apparent that the same results as the pipeline flow shown in FIG. 13 is obtained. In such a case, the execution time of the instruction sequence is shorter by three clock cycles than the execution time of the instruction sequence in the flow shown in FIG. 12.

Thus, not only pipeline stalls to be caused during the execution of a branch instruction but also those to be caused during the fetch of a branch instruction can be avoided.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A program translating apparatus which comprises a translation unit and a link unit, said translation unit translating source programs into machine instruction sequences, storing the machine instruction sequences into files, and outputting the files, said link unit linking a machine instruction sequence stored in a file with another machine instruction sequence stored in another file, wherein said translation unit comprises:

a stack size determination means for determining a stack size to be required for a process of each subroutine included in a source program, and storing the stack size determined into a corresponding file together with a machine instruction sequence of a corresponding subroutine; and wherein said link unit comprises:

a branch instruction detection means for detecting a branch instruction from the machine instruction sequences stored in the files, the branch instruction causing a branch to a subroutine;

a file retrieval means for designating a file where a branch target subroutine is stored, the branch target subroutine being the subroutine to which the branch instruction has caused a branch;

a stack size acquisition means for reading a stack size to be required for a process of the branch target subroutine from the file designated by said file retrieval means; and a first replacement means for replacing the branch instruction with at least one instruction that performs a branch operation and a stack reserve operation consecutively, the branch operation causing a branch to the branch target subroutine and the stack reserve operation reserving a stack for the stack size read by said stack size acquisition means.

2. The program translating apparatus of claim 1, wherein said first replacement means replaces the branch instruction with a single first special instruction.

3. A program translating apparatus which comprises a translation unit and a link unit, said translation unit translating source programs into machine instruction sequences, storing the machine instruction sequences into files, and outputting the files, said link unit linking a machine instruction sequence stored in a file with another machine instruction sequence stored in another file, wherein said translation unit comprises:

a saving register determination means for determining a register to be saved in a process of each subroutine included in a source program, and storing a name of the register into a corresponding file together with a machine instruction of a corresponding subroutine; and wherein said link unit comprises:

a branch instruction detection means for detecting a branch instruction from the machine instruction sequences stored in the files, the branch instruction causing a branch to a subroutine;

a file retrieval means for designating a file where a branch target subroutine is stored, the branch target subroutine being the subroutine to which the branch instruction has caused a branch;

a saving register acquisition means for reading the name of the register determined by said saving register determination means from the file designated by said file retrieval means; and a second replacement means for replacing the branch instruction with at least one instruction that performs a branch operation and a register save operation consecutively, the branch operation causing a branch to the branch target subroutine and the register save operation saving contents of the register whose name has been read by said saving register acquisition means.

4. The program translating apparatus of claim 3, wherein said second replacement means replaces the branch instruction with a single second special instruction.

5. A program translating apparatus which comprises a translation unit and a link unit, said translation unit translating source programs into machine instruction sequences, storing the machine instruction sequences into files, and outputting the files, said link unit linking a machine instruction sequence stored in a file with another machine instruction sequence stored in another file, wherein said translation unit comprises:

a stack size determination means for determining a stack size to be required for a process of each subroutine included in a source program, and storing the stack size determined into a corresponding file together with a machine instruction sequence of a corresponding subroutine; and a saving register determination means for determining a register to be saved in a process of each subroutine included in a source program, and storing a name of the register into a corresponding file together with a machine instruction of a corresponding subroutine; and wherein said link unit comprises:

a branch instruction detection means for detecting a branch instruction from the machine instruction sequences stored in the files, the branch instruction causing a branch to a subroutine;

a file retrieval means for designating a file where a branch target subroutine is stored, the branch target subroutine being the subroutine to which the branch instruction has caused a branch;

a stack size acquisition means for reading a stack size to be required for a process of the branch target subroutine from the file designated by said file retrieval means; and a saving register acquisition means for reading the name of the register determined by said saving register determination means from the file designated by said file retrieval means; and a third replacement means for replacing the branch instruction with at least one instruction that performs a branch operation, a stack reserve operation, and a register save operation consecutively, the branch operation causing a branch to the branch target subroutine, the stack reserve operation reserving a stack for the stack size read by said stack size acquisition means, and the register save operation saving contents of the register designated by said saving register acquisition means.

6. The program translating apparatus of claim 5, wherein said third replacement means replaces the branch instruction with a single third special instruction.

* * * * *